Feb. 3, 1959
E. O. STONE
2,872,616
POWER SUPPLY
Filed Dec. 26, 1956
2 Sheets-Sheet 1
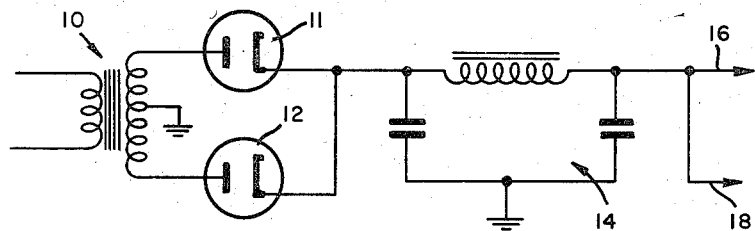
PRIOR ART  FIG-1
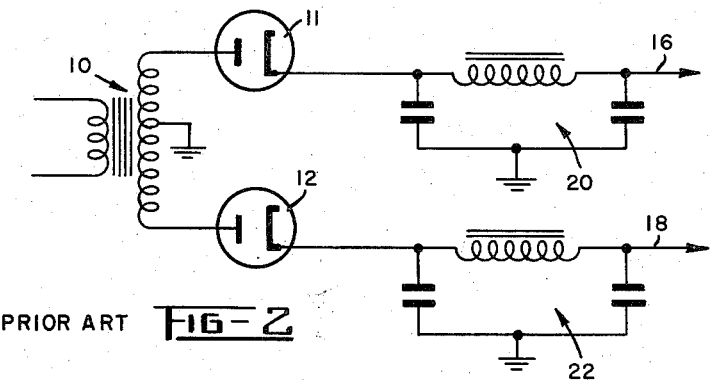
PRIOR ART  FIG-2
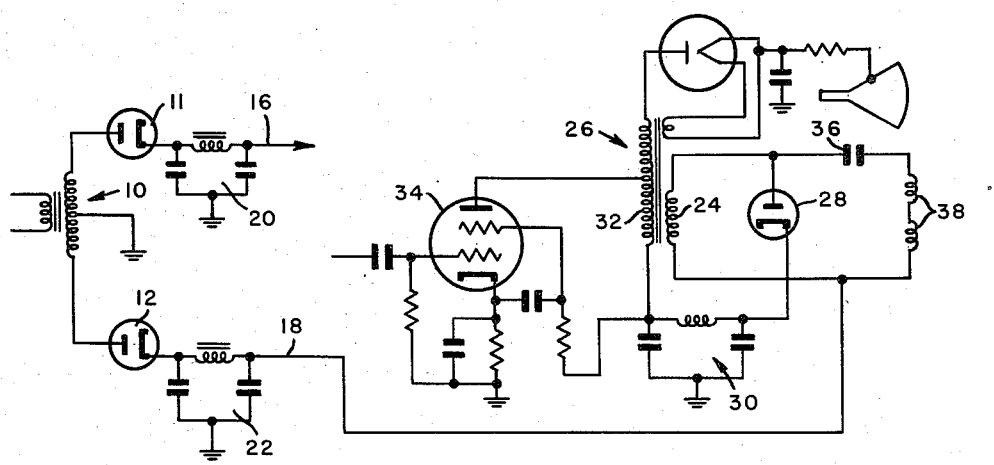
FIG-3
INVENTOR
ELMER O. STONE
BY Michael Hertz
ATTORNEY INVENTOR
ELMER O. STONE
BY Michael Hertz
ATTORNEY

United States Patent Office 2,872,616
Patented Feb. 3, 1959

2,872,616

POWER SUPPLY

Elmer O. Stone, Seneca Falls, N. Y., assignor to Sylvania Electric Products Inc., a corporation of Massachusetts Application December 26, 1956, Serial No. 630,504

9 Claims. (Cl. 315—27)

This invention relates to cathode ray tube circuitry and to the creation of a low voltage direct current supply which is derived from voltages existing in cathode ray deflecting circuits.

It is an object of the invention to dispense with the conventional rectified and filtered alternating current such as afforded by using a step-up transformer connected to the line, rectifiers and following smoothing components.

It is a further object of the invention to simplify the means required for creating a comparatively low voltage rectified current.

It is still another object of the invention to provide a direct current supply voltage in a circuit employing a cathode ray tube by means which are much lighter in weight than means hitherto employed to obtain such voltage.

These and other objects will become clear upon consideration of the following specification and accompanying drawing in which—

Fig. 1 is a circuit diagram of a known form of rectified low voltage supply, shown to clarify the development of the invention.

Fig. 2 is a circuit diagram of a second known form of rectified low voltage supply.

Fig. 3 shows the application of the supply of Fig. 2 to a form of output susceptible of being improved in accordance with the invention.

Figure 4:
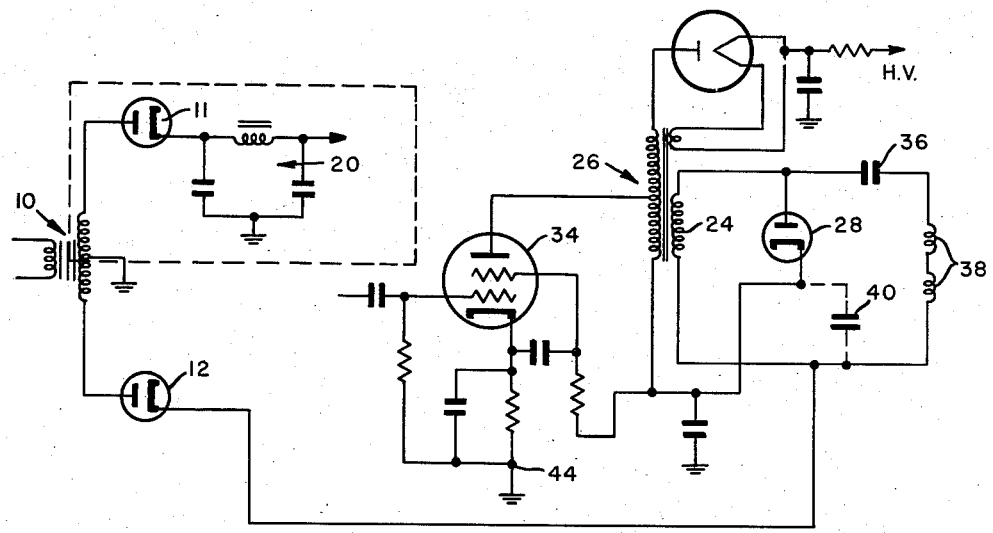
Fig. 4 shows a modification of the structure of Fig. 3 which is in the direction of simplifying the circuitry of Fig. 3 and of reducing the weight of component parts.

Now referring to the drawings in greater detail, consider Fig. 1. This shows a conventional form of low voltage or B+ supply in a television receiver, the same comprising a transformer 10, the primary of which is connected to a 60 cycle 117 volt supply and the secondary of which is center grounded an connected to a pair of half wave rectifiers 11 and 12 feeding a pi filter 14 to smooth out the rectified current. The filtered current is then fed via lines 16 and 18 to several sections of the television receiver and thence via ground, back to the transformer. In actual practice the load on the two lines is about equally divided with one line, as line 16, feeding the tuner, intermediate frequency stages, the audio stages and possibly other elements, and with the other line, as line 18, feeding deflection circuits and providing for the high voltage requisite for the operation of the picture tube. The deflection circuits absorb about as much current as the remainder of the circuit. In the pi filter the condensers are usually of the order of 100 mfd. in view of the heavy current being filtered. The transformer is quite heavy with good sized wire in the secondary to supply the necessary current. In Fig. 2 there is shown a development of the circuit shown in Fig. 1. Here the same transformer 10 and rectifiers 11 and 12 are utilized but the feed to the two lines 16 and 18 is effected independently through two filters 20 and 22. To obtain the same ripple component in this arrangement as in the previous arrangement it is necessary to keep the same sizes of the inductances and condensers in each of the filters 20 and 22 for each filter is in a half wave rectifier circuit and both filters are operating at one-half the frequency and supplying ½ the current of the filter in Fig. 1.

Now the line 16 may feed one section of the receiver, as before, and the line 18 may feed the deflection circuits. The current flowing in line 18 will be fed to the secondary 24 of a two winding horizontal output transformer 26 and thence via damper tube 28, filter 30 and primary winding 32 to the anode of the horizontal driver tube 34. The current then flows through the tube 34 to cathode and ground back to the center tap of the transformer 10. The secondary of the transformer 26 is alternating current coupled via capacitor 36 to the cathode ray tube horizontal deflection coils 38. The secondary circuit of the transformer and plate voltage of the driver tube are relatively immune to 60 cycle hum, provided the hum present does not appear directly across the damper tube, to alter the time at which the damper tube begins to conduct after retrace from one line to the next during the vertical sweep. The 60 cycle voltage developed across the secondary 24 is small since its inductance is of the order of 40 mh. for a 10 mh. deflection yoke; this represents a reactance to a 60 cycle current of approximately 16 ohms. In addition, the yoke 38 is alternating current coupled to the secondary via the capacitor 36 which is of the order of .05 mfd. and which at the 60 cycle level represents a reactance of 270,000 ohms, compared to 4 ohms across the yoke, at the same frequency. Therefore, nearly all of the 60 cycle voltage developed across the transformer appears across the coupling condenser 36 and negligible voltage of this type occurs across the deflection yoke. Such being the case the filter 22 employed to diminish the alternating current ripple may be removed and the circuit rearranged as shown in Fig. 4. Although the rectifier tube 12 is still shown, its presence is not absolutely necessary. Shorting it out places a varying bias on the anode of the damper tube 28 and changes the time at which it begins conducting from one line to the next and of course causes a 60 cycle variation at the left edge of the raster. But waviness at the edge of the raster may be masked out by expanding the width of the trace. Also the capacitor 40 is not absolutely necessary. While its presence in the circuit does add to the filtering of the damper tube current and a return from the cathode of the damper tube 28 to the yoke coils 38 and provides for boost voltage for the tube, its use is not a necessity.

Figure 5:
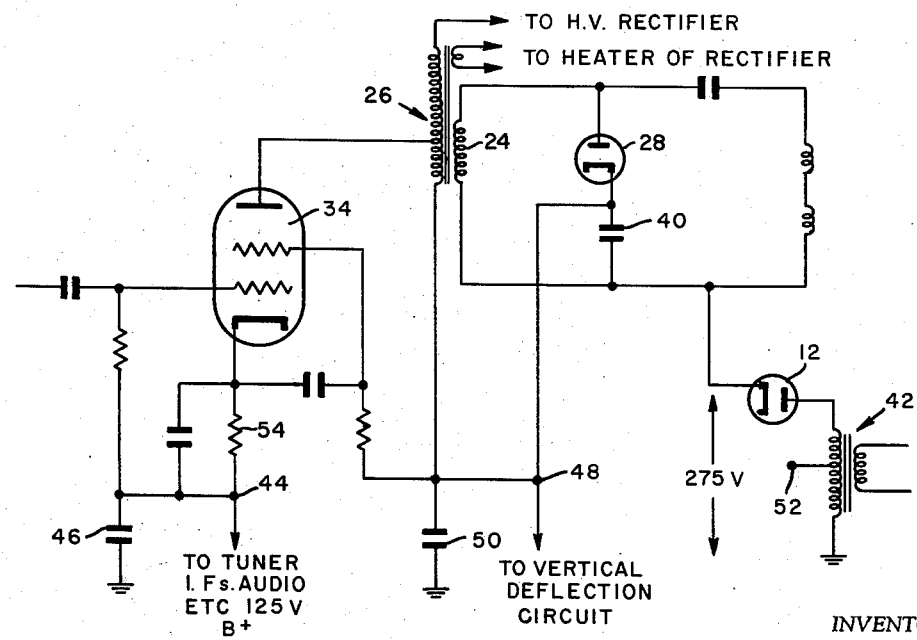
Fig. 5 shows a further development of the circuit of Fig. 4 with the output circuit further simplified and with considerable reduction in cost and material over the circuit shown in Fig. 3.

From the above discussion it is clear that either raw or rectified alternating current voltage may be fed to the transformer secondary 24. Advantage is taken of this to simplify the circuit of Fig. 4. Thus, the rectifier and filter components 11 and 20 shown within the dotted lines of Fig. 4 may be removed. This is effected by removing the ground connection at 44 in Fig. 4 and, as shown in Fig. 5, leading it to the tuner, IF stages, audio stage, etc., where potentials of approximately 125 volts are utilized. The horizontal deflection circuitry is then in series with other parts of the receiver. The components fed from point 44 are by-passed by capacitor 46. The secondary of transformer 42 like transformer 10, is designed to deliver a voltage in excess of 275 volts with the voltage approximately 275 volts beyond the diode 12, if such diode be utilized. Beyond the diode current follows from the transformer 42 to point 48 much like in the case of Fig. 3, the current flowing through the secondary 24 of transformer 26, the damper tube 28 to point 48 from which electrical energy, filtered by action of capacitor 50, is fed to the vertical deflection circuits. Also from point 48 current is fed via the primary of transformer 26 to tube 34 and its by passed resistor 54 to other sections of the receiver, this current being further filtered by action of capacitor 46. Sufficient drop and filtering occurs at point 44 to afford the requisite voltage and current for supplying said other sections of the receivers. At most only one diode or half wave rectifier 12 is needed instead of a full wave rectifier. Note also that the filter 14 of Fig. 1 or filters 20 and 22 of Fig. 2 have been eliminated thereby dispensing with the heavy chokes and large condensors used in the filters. The secondary of the transformer 42, may if desired be tapped to provide a terminal, as 52, at lower potential than exists across the secondary.

Having thus described the invention what is claimed as new is:

1. A cathode ray tube having an envelope, cathode ray deflection coils mounted on the envelope, a pulse transformer the secondary of which is connected to said coils by two conductors, a horizontal deflection driver tube having an anode, a cathode and a control grid, a diode having one terminal connected to one of the conductors and the other terminal connected via the primary of the transformer to the anode of the deflection tube, a capacitor between the anode of the diode and the deflection coils, the cathode of the deflection tube being connected via other circuit portions of the receiver to ground, and an alternating current supply having one lead connected to the other of the two conductors and the other lead connected to ground.

2. A cathode ray tube having an envelope, cathode ray deflection coils mounted on the envelope, a pulse transformer the secondary of which is connected to said coils by two conductors, a capacitor in series with one of the conductors, a horizontal deflection driver tube having an anode, a cathode and a control grid, a diode having one terminal connected to one of the conductors and the other terminal connected via the primary of the transformer to the anode of the deflection tube, a capacitor between the anode and the diode and the deflection coils, the cathode of the deflection tube being connected via other circuit portions of the receiver to ground, and an alternating current supply having one lead connected to the other of the two conductors and the other lead connected to ground.

3. A cathode ray tube having an envelope, cathode ray deflection coils mounted on the envelope, a pulse transformer the secondary of which is connected to said coils by two conductors, a horizontal deflection driver tube having an anode, a cathode and a control grid, a diode having one terminal connected to one of the conductors and the other terminal connected via the primary of the transformer to the anode of the deflection tube, the cathode of the deflection tube being connected via other circuit portions of the receiver to ground, and an alternating current supply having one lead connected to the other of the two conductors via a rectifier and the other lead connected to ground.

4. A cathode ray tube having an envelope, cathode ray deflection coils mounted on the envelope, a pulse transformer the secondary of which is connected to said coils by two conductors, a horizontal deflection driver tube having an anode, a cathode and a control grid, a diode having one terminal connected to one of the conductors and the other terminal via a capacitor to the other conductors, said diode being also connected via the primary of the transformer to the anode of the deflection tube, the cathode of the deflection tube being connected via other circuit portions of the receiver to ground, and an alternating current supply having one lead connected to the other of the two conductors and the other lead connected to ground.

5. A cathode ray tube having an envelope, cathode ray deflection coils mounted on the envelope, a pulse transformer the secondary of which is connected to said coils by two conductors, a horizontal deflection driver tube having an anode, a cathode and a control grid, a diode having one terminal connected to one of the conductors and the other terminal connected via the primary of the transformer to the anode of the deflection tube, the cathode of the deflection tube being connected via other circuit portions of the receiver to ground, a capacitor in shunt relation to said other portions of the receiver, and an alternating current supply having one lead connected to the other of the two conductors and the other lead connected to ground.

6. A cathode ray tube having an envelope, cathode ray deflection coils mounted on the envelope, a pulse transformer the secondary of which is connected to said coils by two conductors, a capacitor in series with one of the conductors, a horizontal deflection driver tube having an anode, a cathode and a control grid, a diode having one terminal connected to one of the conductors and the other terminal connected via the primary of the transformer to the anode of the deflection tube, the cathode of the deflection tube being connected via other circuit portions of the receiver to ground, a capacitor in shunt relation to said other portions of the receiver, and an alternating current supply having one lead connected to the other of the two conductors and the other lead connected to ground.

7. A cathode ray tube having an envelope, cathode ray deflection coils mounted on the envelope, a pulse transformer the secondary of which is connected to said coils by two conductors, a capacitor in series with one of the conductors, a horizontal deflection driver tube having an anode, a cathode and a control grid, a vertical deflection circuit, a diode having one terminal connected to one of the conductors and the other terminal connected to said vertical deflection circuit, a capacitor by passing said circuit, a further connection from said other diode terminal to the primary of the transformer and via the primary of the transformer to the anode of said driver tube, a parallel resistor and capacitor combination connected to the cathode of the tube, other circuits in series with the parallel resistor and capacitor combination, and a by pass capacitor shunting said other circuits.

8. In a receiver, a cathode ray tube having an evacuated envelope, cathode ray deflection coils mounted on the envelope, a horizontal deflection driver tube having at least an anode and a cathode, a transformer having a secondary with two conductors connected to said coils, a diode having one terminal connected to one of said conductors and the other terminal connected via other circuit portions of the receiver to ground and to the primary of the transformer and through said primary to the anode of said driver tube, a load fed from the cathode of said driver tube, and an alternating current supply having one lead connected to the other of the two conductors and the other lead connected to ground.

9. In a receiver, a cathode ray tube having an evacuated envelope, cathode ray horizontal deflection coils mounted on the envelope, a vertical deflection circuit for said tube, a horizontal deflection driver tube having at least an anode, and a cathode, a transformer having a secondary with two conductors connected to said coils, a diode having one terminal connected to one of said conductors and the other terminal connected via the vertical deflection circuit receiver and to the primary of the transformer and through said primary to the anode of said driver tube, a load fed from the cathode of said driver tube, and an alternating current supply having one lead connected to the other of the two conductors and the other lead connected to ground.

References Cited in the file of this patent

UNITED STATES PATENTS

| | | |
|---|---|---|
| 2,524,530 | Lawson | Oct. 3, 1950 |
| 2,589,299 | Setchell | Mar. 18, 1952 |
| 2,621,309 | Faudell | Dec. 9, 1952 |
| 2,658,163 | De Cola | Nov. 3, 1953 |